United States Patent
Dau et al.

(10) Patent No.: US 11,683,771 B2
(45) Date of Patent: Jun. 20, 2023

(54) METHOD AND APPARATUS FOR DATA FRAME SYNCHRONIZATION OF 5G BASE STATION

(71) Applicant: VIETTEL GROUP, Ha Noi (VN)

(72) Inventors: Hong Quan Dau, Ha Noi (VN); Quoc Thanh Phan, Ho Chi Minh (VN); Thien Vu Tang, Ha Noi (VN); Quoc Viet Ta, Ha Noi (VN); Chi Linh Nguyen, Ha Noi (VN)

(73) Assignee: VIETTEL GROUP, Ha Noi (VN)

( * ) Notice: Subject to any disclaimer, the term of this patent is extended or adjusted under 35 U.S.C. 154(b) by 0 days.

(21) Appl. No.: 17/537,490

(22) Filed: Nov. 30, 2021

(65) Prior Publication Data
US 2022/0174629 A1 Jun. 2, 2022

(30) Foreign Application Priority Data
Nov. 30, 2020 (VN) .............................. 1-2020-06923

(51) Int. Cl.
*H04W 56/00* (2009.01)
(52) U.S. Cl.
CPC .............................. *H04W 56/0015* (2013.01)
(58) Field of Classification Search
CPC .................................................... H04W 56/00
See application file for complete search history.

(56) References Cited

U.S. PATENT DOCUMENTS

| | | | | |
|---|---|---|---|---|
| 3,634,633 A * | 1/1972 | Driscoll | ................ | H04M 3/326 379/23 |
| 5,905,758 A * | 5/1999 | Schweiter, III | ........ | H04B 10/40 398/135 |
| 6,738,275 B1 * | 5/2004 | Beland | ................ | H02M 3/3376 363/21.02 |
| 6,967,559 B2 * | 11/2005 | Beland | .................... | H02M 7/49 29/605 |
| 7,375,993 B2 * | 5/2008 | Beland | ..................... | H05G 1/10 363/71 |
| 7,936,544 B2 * | 5/2011 | Beland | ..................... | H05G 1/12 378/118 |
| 8,116,405 B2 * | 2/2012 | Cho | ...................... | H04J 3/0664 370/510 |
| 8,571,179 B2 * | 10/2013 | Beland | ..................... | H05G 1/10 378/197 |

(Continued)

FOREIGN PATENT DOCUMENTS

CN 1731704 A * 2/2006
CN 1773887 A * 5/2006
(Continued)

*Primary Examiner* — Berhanu Tadese
(74) *Attorney, Agent, or Firm* — PATENTTM.US

(57) ABSTRACT

The method of synchronizing data frames between 5G baseband processing stations by a global position system (GPS)-integrated local oscillator block control, including the following steps: step 1: synchronize the baseband processor's local oscillator block with the GPS's 1 pps (pulse per second) pulse and generate a 10 ms (millisecond) pulse from the local oscillator; step 2: use the 10 ms synchronous pulse sync monitor block to get the sync offset between this pulse and the GPS 1 pps pulse; step 3: use the control algorithm to reconfigure the local oscillator so that the 10 ms synchronous pulse can follow the 1 pps GPS pulse.

1 Claim, 4 Drawing Sheets

(56) References Cited

U.S. PATENT DOCUMENTS

| | | | |
|---|---|---|---|
| 8,675,378 B2 * | 3/2014 | Beland | H02M 1/088 363/71 |
| 8,738,127 B1 * | 5/2014 | Lebovitz | A61M 5/1723 607/3 |
| 8,923,361 B2 * | 12/2014 | Oda | H02H 7/30 375/133 |
| 9,061,153 B1 * | 6/2015 | Lebovitz | A61B 5/4836 |
| 9,537,576 B2 * | 1/2017 | Wu | H04L 25/00 |
| 9,684,020 B2 * | 6/2017 | Rudolph | H04J 3/0644 |
| 10,491,222 B2 * | 11/2019 | Parekh | H03L 7/183 |
| 10,496,041 B2 * | 12/2019 | Yao | G04F 10/005 |
| 10,498,344 B2 * | 12/2019 | Janardhanan | H03L 7/148 |
| 10,505,554 B2 * | 12/2019 | Janardhanan | H03L 7/091 |
| 10,505,555 B2 * | 12/2019 | Parekh | H03L 7/087 |
| 10,516,401 B2 * | 12/2019 | Janardhanan | H03L 7/081 |
| 10,516,402 B2 * | 12/2019 | Lindgren | H03L 7/10 |
| 10,686,456 B2 * | 6/2020 | Janardhanan | H03L 7/083 |
| 10,691,074 B2 * | 6/2020 | Yao | H03L 7/085 |
| 10,727,846 B2 * | 7/2020 | Janardhanan | H03L 7/087 |
| 10,868,550 B2 * | 12/2020 | Janardhanan | H03L 7/087 |
| 11,409,001 B2 * | 8/2022 | Liu | G01S 19/43 |
| 2009/0034672 A1 * | 2/2009 | Cho | G04R 20/06 342/357.44 |
| 2010/0135336 A1 * | 6/2010 | Zhou | G04G 5/00 713/400 |
| 2013/0307724 A1 * | 11/2013 | Kim | G04R 20/06 342/357.73 |
| 2018/0270773 A1 * | 9/2018 | Lee | H04W 56/0015 |
| 2020/0112933 A1 * | 4/2020 | Sheashua | H04W 56/00 |
| 2020/0127748 A1 * | 4/2020 | Yanagisawa | H04H 60/40 |
| 2020/0367076 A1 * | 11/2020 | Lam | H04W 92/12 |
| 2022/0146688 A1 * | 5/2022 | Kim | G01S 19/258 |
| 2022/0174629 A1 * | 6/2022 | Dau | H04W 56/0035 |

FOREIGN PATENT DOCUMENTS

| | | | | |
|---|---|---|---|---|
| CN | 1312929 C | * | 4/2007 | H04N 21/2383 |
| CN | 110515104 A | * | 11/2019 | |
| CN | 110531380 A | * | 12/2019 | |
| CN | 112713925 A | * | 4/2021 | G01S 19/03 |
| CN | 111580380 B | * | 5/2021 | G04G 7/00 |
| CN | 110536405 B | * | 8/2021 | H04B 7/0413 |
| CN | 113885055 A | * | 1/2022 | |
| CN | 114650117 A | * | 6/2022 | |
| EP | 3403451 B1 | * | 11/2019 | H04B 1/0475 |
| EP | 3031162 B1 | * | 10/2022 | H04H 20/423 |
| GB | 2325069 A | * | 11/1998 | H04W 84/022 |
| GB | 2388264 A | * | 11/2003 | G04G 7/00 |
| GB | 2546295 A | * | 7/2017 | H04B 7/2687 |
| JP | 2006010638 A | * | 1/2006 | |
| JP | 4347978 B2 | * | 10/2009 | |
| JP | 2010004413 A | * | 1/2010 | H04W 56/0015 |
| KR | 636385 B1 | * | 10/2006 | H04B 17/00 |
| KR | 2042423 B1 | * | 11/2019 | G01S 19/23 |
| KR | 960027548 A | * | 11/2019 | |
| KR | 2101995 B1 | * | 4/2020 | G01S 19/423 |
| RU | 2655692 C1 | * | 5/2018 | |
| VN | 10026258 B | * | 11/2020 | |
| VN | 10026373 B | * | 11/2020 | |
| VN | 10026522 B | * | 12/2020 | |
| WO | WO-2005124385 A1 | * | 12/2005 | G01S 5/14 |
| WO | WO-2012058986 A1 | * | 5/2012 | H04W 56/00 |
| WO | WO-2012105758 A2 | * | 8/2012 | G01S 19/33 |
| WO | WO-2012105758 A3 | * | 11/2012 | G01S 19/33 |
| WO | WO-2014089988 A1 | * | 6/2014 | G01S 19/246 |
| WO | WO-2015018179 A1 | * | 2/2015 | G01S 19/00 |
| WO | WO-2016115922 A1 | * | 7/2016 | H04W 56/00 |
| WO | WO-2016210302 A1 | * | 12/2016 | H04B 7/0695 |
| WO | WO-2017121606 A1 | * | 7/2017 | H04B 1/0475 |
| WO | WO-2018062535 A1 | * | 4/2018 | A61B 5/00 |
| WO | WO-2019014758 A1 | * | 1/2019 | H04J 3/0635 |
| WO | WO-2019163679 A1 | * | 8/2019 | G04G 7/00 |
| WO | WO-2020204212 A1 | * | 10/2020 | G01S 19/256 |

* cited by examiner

METHOD AND APPARATUS FOR DATA FRAME SYNCHRONIZATION OF 5G BASE STATION

FIELD OF THE DISCLOSURE

The present disclosure relates to systems and methods for data frame synchronization between 5G base stations. Particularly, the mentioned method is to synchronize uplink and downlink slots for base stations in order to eliminate interference.

DESCRIPTION OF THE RELATED ART

In 5G mobile network, Time Division Duplex (TDD) technique is used to improve flexibility and spectral efficiency. TDD refers to duplex communication links where uplink is separated from downlink by the allocation of different time slots in the same frequency band.

However, the advantages of time division duplex are counter-balanced by the precise timing and synchronization required to prevent intra-cell or inter-cell interference. More specifically, when two baseband processing stations use adjacent channels, transmission of the uplink at the edge of one channel may interfere with the transmission of the downlink at the edge of another channel if these two transmissions occur at the same time. The interference phenomenon will reduce the quality of 5G baseband processing stations by distorting the transmission signal. The solution to this challenge is to synchronize the data frame between 5G baseband processing stations, in other words to ensure that the TDD time slot between baseband processing stations is always the same for transmission of the uplink occurs only at one time and transmission of downlink occurs only at another time.

Currently, no method has been proposed and implemented to solve the above problem.

SUMMARY OF THE DISCLOSURE

In this disclosure, 5G baseband processing stations use pulses with a period of 10 ms to determine the data frame times of the uplink and downlink. Thus, the purpose of the present disclosure is to ensure the phase and frequency synchronization of the 10 ms pulses of 5G baseband processing stations at all times, according to which the local oscillator block control method uses GPS (Global Positioning System) is applied. When applying this method, 5G baseband processing stations will have synchronized data frames, thereby solving the problem of interference between transmission of the uplink and downlink, helping to improve the quality of the 5G transceiver system.

To achieve the above purpose, the method is to control the local oscillator block using GPS, including the following steps:

Step 1: Synchronize the baseband processor's local oscillator block with the GPS's 1 pps pulse and generate 10 ms pulse from the local oscillator.

Step 2: Use the 10 ms synchronous pulse sync monitor block to get the sync offset between this pulse and the GPS 1 pps pulse.

Step 3: Use the control algorithm to reconfigure the local oscillator so that the 10 ms synchronous pulse can follow the 1 pps GPS pulse.

With this method, the 10 ms synchronization pulses of the baseband processing stations will be generated and synchronized with the 1 pps pulses—the pulses have been synchronized with the GPS's 1 pps pulses. From there all 10 ms synchronization pulses on baseband processing stations will be synchronized with each other.

DETAIL DESCRIPTION

To solve the problem of 10 ms pulse synchronization on 5G baseband processing stations, the present disclosure uses GPS technology. GPS technology provides 1 pps pulse as a reference signal to the local oscillator block in baseband processing stations for synchronization. In which, 1 pps (one pulse per second) is a signal pulse with a width of less than one second and rising with a period of one second. The local oscillator block in 5G baseband processing stations is the chip that generates and provides oscillator pulses to other components in the station. Local oscillator blocks are usually provided with a standard reference pulse so that the local oscillator pulse can be generated stably and accurately. Thus, the 1 pps GPS pulse will be provided as a reference pulse for the local oscillator blocks so that the local oscillator frequencies are synchronized with each other. The rising edge of the 1 pps pulse from the GPS block will be used by a 10 ms counter to start generating the 10 ms pulse. The 10 ms counter relies on the frequency of the baseband processor's local oscillator to generate the next 10 ms pulses. Theoretically, since the station's 10 ms pulse is generated from the local oscillator block which is already synchronized with the GPS's 1 pps pulse, the 10 ms pulses of the stations should be synchronized with each other. However, the local oscillator frequency of the baseband processing stations providing the 10 ms pulse generator block may be biased (due to reasons such as ambient temperature, . . . ) leading to a situation where the 10 ms pulse timing error for GPS 1 pps pulse is accumulated, 10 ms pulses at stations will be out of phase when running for a long time. Therefore, in addition to using the GPS pulse 1 pps to initiate a 10 ms pulse at the stations, the present disclosure uses an oscillator controller to control the frequency of the local oscillator so that the 10 ms pulse at the stations is frequency synchronous with one another.

Figure 1:
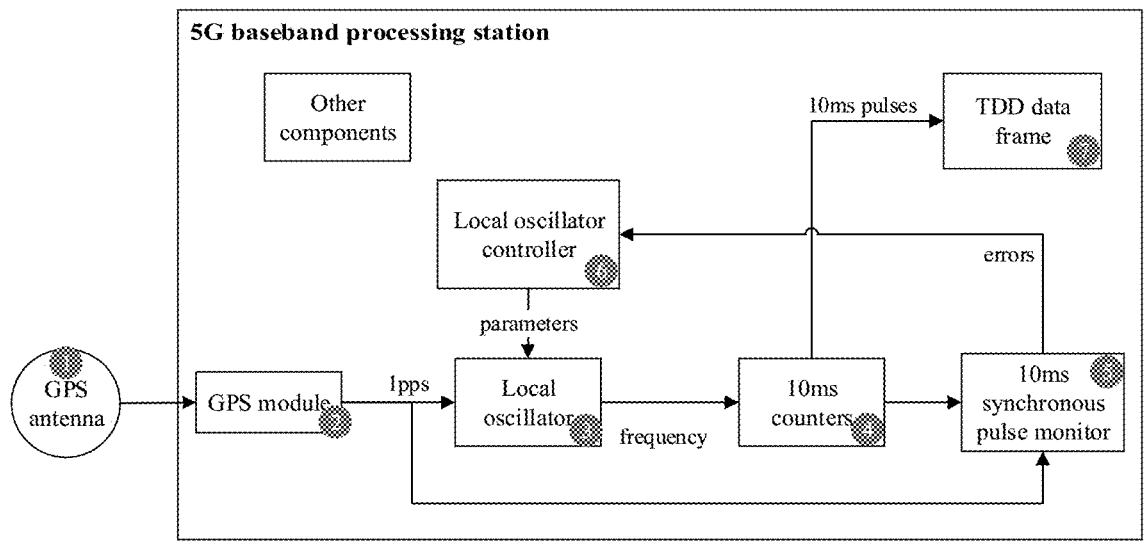
FIG. 1 illustrates the functional blocks of the 5G baseband processing station in the method of controlling the local oscillator block using GPS.

Thus, the data frame synchronization method in the 5G base processing station using the GPS-based local oscillator block control method has the blocks and tuples shown in FIG. 1, including:

Block GPS antenna: get GPS signal from GPS satellite.

GPS block: receive GPS signal from GPS antenna and provide 1 pps pulse to the station's local oscillator block.

Local oscillator: uses 1 pps pulse from GPS block as reference pulse to generate local oscillator pulse, local oscillator pulse is supplied to 10 ms counter. In addition, the local oscillator must be configurable, which means that it can be operated (by parameter configuration) to adjust the local oscillator frequency.

10 ms counter: this receives local oscillator pulses from the local oscillator to generate a 10 ms pulse.

10 ms synchronous pulse monitor: monitors the 10 ms synchronous pulse from the 10 ms counter and calculates the error between 100 of 10 ms pulses and 1 pps pulses, providing this error to the local oscillator.

Local oscillator controller: use the error provided from the 10 ms synchronous pulse monitor to calculate configuration parameters, these configuration parameters will be used to adjust the local oscillator.

TDD data frame block: This block uses 10 ms synchronous pulse to perform transmission of uplink and downlink.

Figure 2:
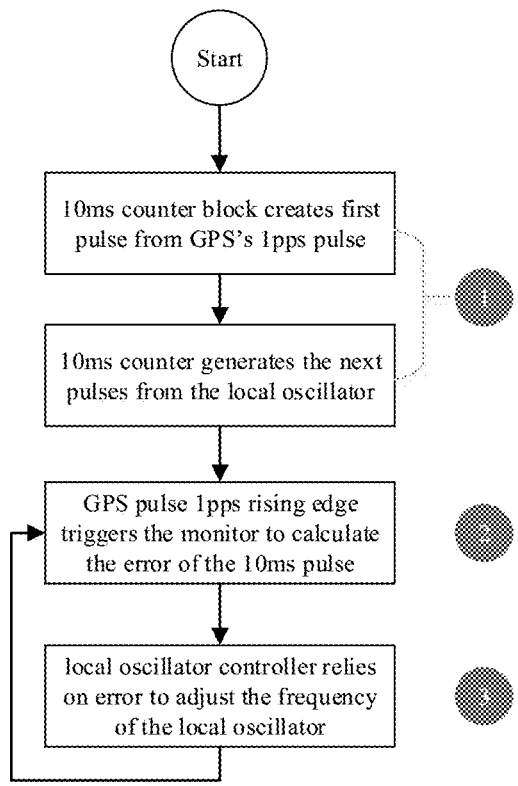
FIG. 2 illustrates the 10 ms pulse synchronization process on 5G baseband processing stations.

The 10 ms pulse synchronization process on the stations is shown in FIG. 2, the steps are as follows:

Step 1: Synchronize the baseband processor's local oscillator block with the GPS's 1 pps pulse and generate a 10 ms pulse from the local oscillator.

The objective of this step is to use the 1 pps GPS pulses as the reference input for the local oscillator block. Based on the 1 pps GPS reference pulses, the local oscillator will generate local oscillator pulses to provide other components of the GPS station, including a 10 ms counter block to generate a 10 ms pulse. After the 10 ms counter is given frequency, the counter starts to pulse from the GPS 1 pps pulse rising edge. At the rising edge of the 1 pps pulse, the counter starts counting from one and counting according to the frequency of the local oscillator. The 10 ms counter generates the next pulses from the local oscillator. Suppose with a local oscillator with frequency x Hz, where X is the local oscillator's frequency, when the counter reaches the value x/100 (due to 10 ms=1/100 s), generate a 10 ms pulse and reset the count value to one. Thus, after step 1, a 10 ms pulse was generated based on the local oscillator block of the baseband processing station.

Step 2: use the 10 ms synchronous pulse sync monitor block to get the sync offset between this pulse and the GPS 1 pps pulse; The input to this step is the 10 ms counter variable value and the GPS 1 pps pulse generated from step 1. At this step, the GPS 1 pps pulse rising edge triggers the monitor to calculate the error of the 10 ms pulse. The error is calculated as the difference between the desired value of x/100 and the counter value at the time of the 1 pps pulse rising edge. This error value is the cumulative deviation of 100 of 10 ms pulses compared to 1 second of 1 pps GPS pulses, which is also the output value of step 2. The error value will be put into a memory area for use as input for step 3.

Step 3: Use the control algorithm to reconfigure the local oscillator so that the 10 ms synchronous pulse can follow the 1 pps GPS pulse.

The input of this step is the error value calculated in step 2. At this step, each time the error value is calculated and put into the memory area, the local oscillator controller relies on this error to adjust frequency of the local oscillator pulses such that the error values of the subsequent times converge to 0. To achieve this, the local oscillator controller will apply some control algorithm (for example, the control algorithm), on-off control or PID proportional integral control algorithm) to calculate and adjust the local oscillator frequency, finally, the 10 ms pulse was synchronized with the GPS 1 pps pulse. After adjusting the local oscillator frequency, the oscillator continues to wait for the next error value.

Figure 3:
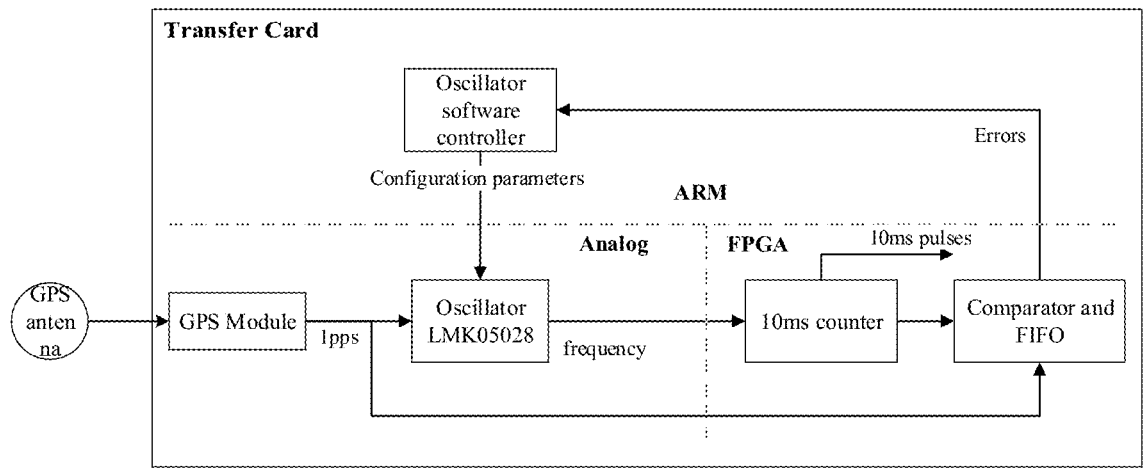
FIG. 3 illustrates the FPGA coordination system, software and hardware applied to the data transmission circuit block (Transfer Card) in the 5 G baseband processing station system.

The method of synchronizing data frames between 5G baseband processing stations by GPS-integrated local oscillator block control with the mentioned components is implemented into an apparatus, which is called Transfer Card. This apparatus is a combination of FPGA (Field-programmable gate array) programmable logic circuit, software and hardware and is described as FIG. 3. Specifically as follows:

Hardware includes:
GPS antenna, GPS module has the ability to synchronize with GPS system and generate 1 pps pulses.
The local oscillator LMK05028 with DCO (Digitally Controlled Oscillator) feature allows the output frequency to be adjusted as desired.

FPGAs include:
10 ms counter using FPGA. The local oscillator LMK05028 provides 245.76 MHz frequency with 10 ms counter. The counter will generate 2457600 pulses every 10 ms.
The 10 ms synchronous clock monitor is an FPGA comparator, the calculated value is stored in the FIFO (FPGA's first-in-first-out memory).

The software performs the DCO configuration parameter calculation function to control the LMK05028 based on the PID algorithm, running on the ARM processor core.

The control object of the PID algorithm is the parameter G to configure the DCO for the LMK05028 oscillator, with the control equation: $G=KP*e+KI*\Sigma e+KD*\Delta e$.

In which:

e: is the error read out from the FIFO calculated and pushed in by the 10 ms synchronous clock monitor.

$\Sigma e$: is the accumulated error in the past of the current e and e.

$\Delta e$: is the error between the current e and the previous e a point in time.

Choosing a suitable set of parameters KP, KI, KD will help the 10 ms pulse synchronize with the GPS 1 pps pulse faster and more stable.

The system using the previous data frame synchronously will be measured and tested in two ways as follows:

The first evaluation: evaluates the synchronization ability based on a data transmission circuit, including the instantaneous difference between 10 ms and 1 pps pulses. This deviation represents the synchronization of the 10 ms pulse to the 1 pps GPS pulse.

The second evaluation method: evaluate the synchronization ability of two 10 ms pulses on two data transmission circuits. The difference between these two pulses will be measured directly on the oscilloscope.

The first way to evaluate: evaluate the synchronization capability based on a data transmission circuit.

Figure 4:
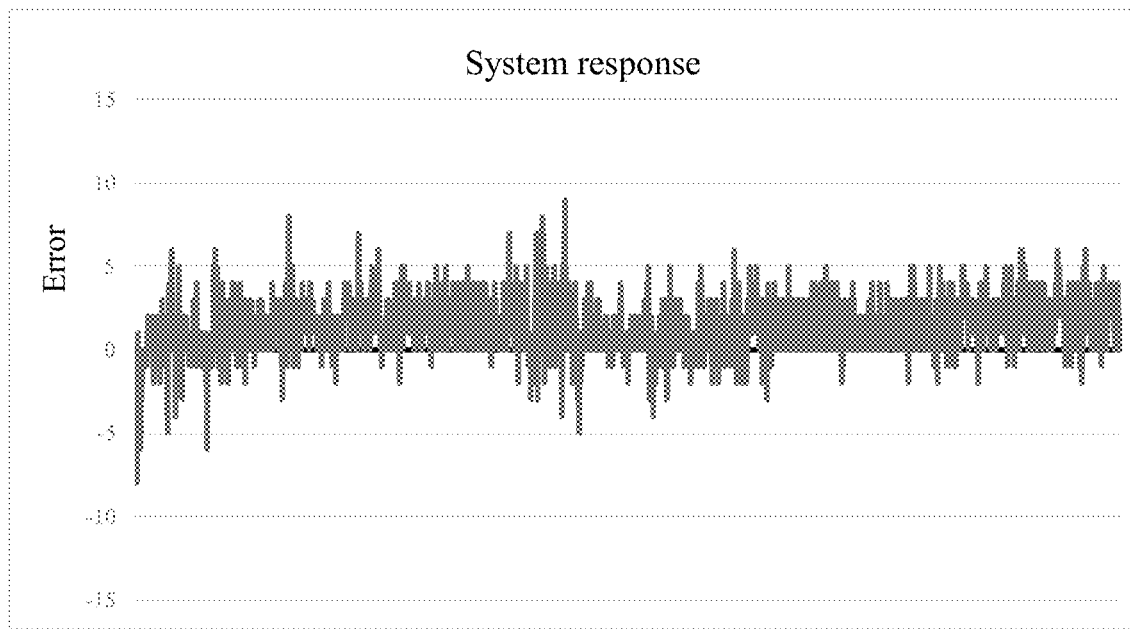
FIG. 4 illustrates the evaluation of synchronization capabilities based on a data transmission circuit placed in a laboratory environment.

For the evaluation system placed in a laboratory environment, the system ran for 13 hours continuously, 4096 valuable samples were collected every 10 s. The graph illustrating the phase difference compensation control response of up to nine pulses when the system is stable, corresponding to 36 ns, is shown in FIG. 4.

Figure 5:
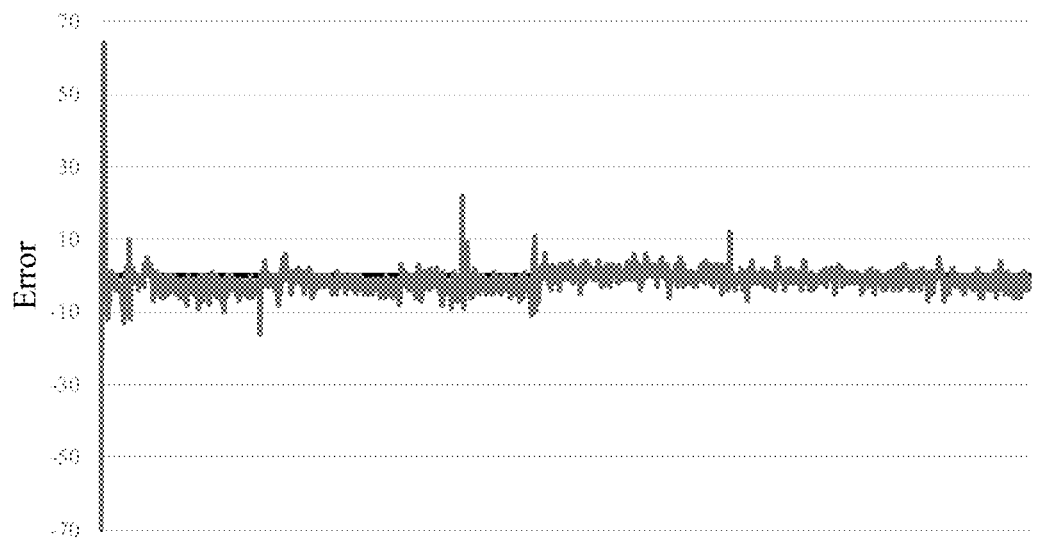
FIG. 5 illustrates the evaluation of synchronization capability based on a data transmission circuit placed in an environment of rapidly changing fan speed.

For the evaluation system placed in an environment of rapidly changing fan speed, the system ran for 19 hours continuously, 7139 value samples were collected every 10 s. The graph illustrating the phase difference compensation control response up to twenty pulses when the system is stable, corresponding to 80 ns, is shown in FIG. 5.

Figure 6:
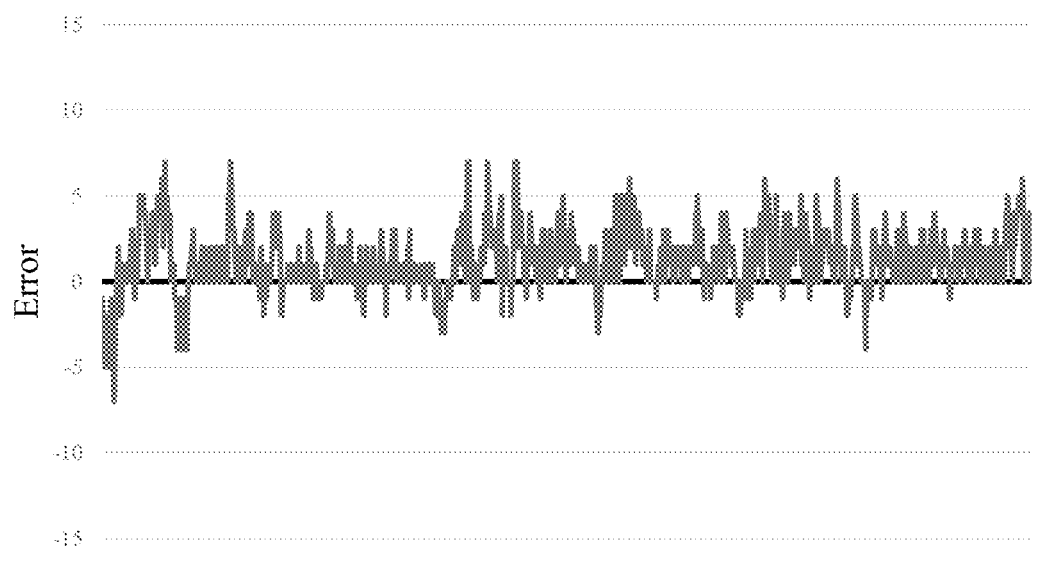
FIG. 6 illustrates the evaluation of synchronization capability based on a data transmission circuit placed in an environment of rapidly changing fan speed.

For the evaluation system placed in an environment of slow change of cooling fan speed, the system ran for 5 hours continuously, 1742 value samples were collected every 10 s. The graph illustrating the phase difference compensation control response of up to eight pulses when the system is stable, corresponding to 32 ns, is shown in FIG. 6.

The second evaluation method: evaluate the synchronization ability of two 10 ms pulses on two data transmission circuits.

Figure 7:
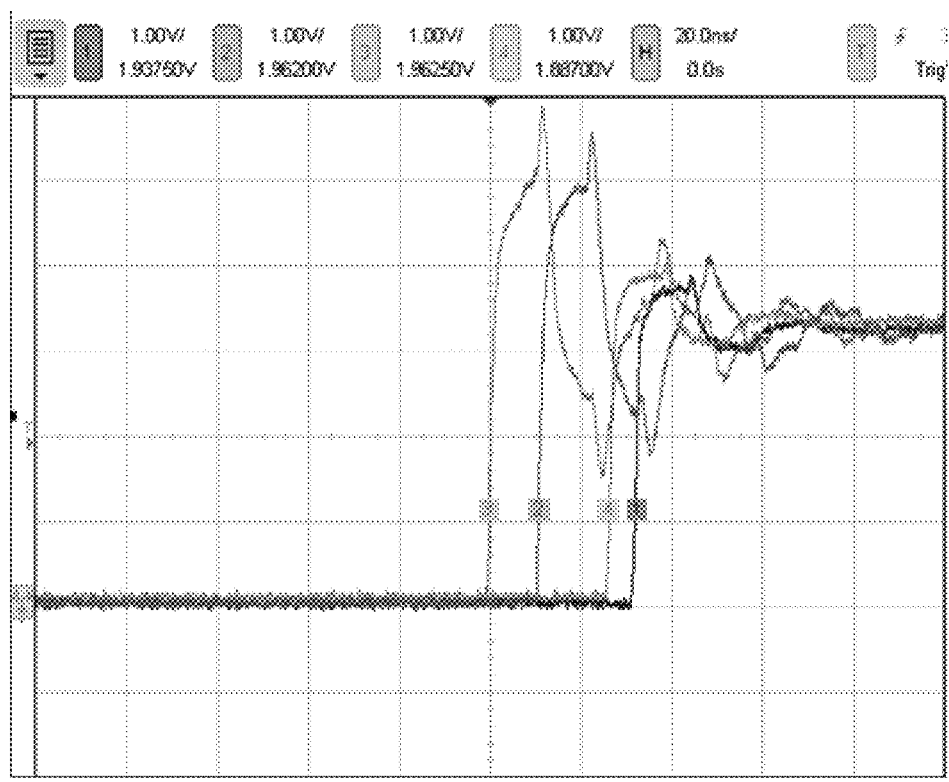
FIG. 7 illustrates the evaluation of the synchronization ability of two 10 ms pulses on two data transmission circuits on an oscilloscope.

The system of two data transmission circuits is set up running 10 ms pulse synchronization algorithm, the 10 ms and 1 Hz signals of each data transmission circuit are connected to the measuring heads of the oscilloscope. FIG. 7 illustrates the measurement results on an oscilloscope for 6 hours. The pair of pulses [1] and [3] corresponds to a pair of 1 pps and 10 ms pulses on the first data transmission circuit. The pair of pulses [2] and [4] corresponds to a pair of 1 pps and 10 ms pulses on the second data transmission circuit.

The results show:
Each data transmission circuit has good tracking of GPS 1 pps respectively on each data transmission circuit with phase difference not exceeding 80 ns.
The algorithm ensures that the system runs for a long time and the system remains stable.

The method of local oscillator block control using GPS synchronized data frames in 5G baseband processing stations is provided, thereby solving the problem of interference between the transmission of the uplink and the downlink of the algorithm. time division duplex multiplexing, which improves the quality of the 5G transceiver system. In addition, the 5G baseband processing station system using this method has achieved good synchronization results and ensures long-term stability.

While preferred embodiments of the present invention have been shown and described, it will be apparent to those skilled in the art that many changes and modifications may be made without departing from the invention in its broader aspects. The appended claims are therefore intended to cover all such changes and modifications as fall within the true spirit and scope of the invention.

What is claimed is:

1. A data frame synchronization method in a 5G baseband processing station, using a global position system (GPS)-integrated local oscillator block controller, the method comprising the steps of:
receiving a GPS signal via a block of GPS antenna from a GPS satellite;
receiving the GPS signal, in a GPS block, from the GPS antenna and provide a 1 pps (pulse per second) pulse from a station's local oscillator block;
using the 1 pps pulse from the GPS block as reference pulse, generate a local oscillator pulse,
wherein the local oscillator pulse is supplied to a 10 ms (millisecond) counter;
wherein the local oscillator is configurable, whereby it can be operated by a parameter configuration to adjust a local oscillator frequency;
receiving, using a 10 ms counter, the local oscillator pulses from the local oscillator to generate 10 ms pulses;
monitoring, using a 10 ms synchronous plus counter, a 10 ms synchronous pulse from the 10 ms counter to calculate an error between 100 of the 10 ms pulses and 1 pps pulses, to provide the error to the local oscillator;
calculating, by a local oscillator controller, configuration parameters using the error provided from the 10 ms synchronous pulse monitor, wherein the configuration parameters are used to adjust the local oscillator block;
carry out transmission of uplink and downlink, using a TDD data frame block; wherein the block uses 10 ms synchronous pulse;
wherein the above steps are performed in the blocks above as follows:
Step 1: synchronize the baseband processor's local oscillator block with the GPS's 1 pps pulse and generate a 10 ms pulse from the local oscillator;
using the GPS 1 pps pulse as the reference input for the local oscillator block; based on the 1 pps GPS reference pulse, the local oscillator block generates an local oscillator pulse to provide other components of the 5G baseband processing station, including the 10 ms counter to generate the 10 ms pulse; after the 10 ms counter is given frequency, the counter starts to pulse from the GPS 1 pps pulse rising edge; at the rising edge of the 1 pps pulse, the counter starts counting from one and counting according to the frequency of the local oscillator; the 10 ms counter generates the next pulses from the local oscillator; when the counter reaches the value (local oscillator frequency)/100 (due to 10 ms=1/100 s), generate a 10 ms pulse and reset the count value to one; so, after step 1, a 10 ms pulse was generated based on the local oscillator block of the baseband processing station;
Step 2: use the 10 ms synchronous pulse sync monitor block to get the synchronous offset between this pulse and the GPS 1 pps pulse;
Input of this step is the counter variable value of 10 ms counter and 1 pps GPS pulse generated from step 1; at this step, the GPS pulse 1 pps rising edge triggers the monitor to calculate the error of the 10 ms pulse; the error is calculated as the difference between the desired value of (local oscillator frequency)/100 and the counter value at the time of the 1 pps pulse rising edge; this error value is the cumulative deviation of 100 of 10 ms pulses compared to 1 second of 1 pps GPS pulses, which is also the output value of step 2; the error value will be put into a memory to be used as input for step 3;
Step 3: use a control algorithm to reconfigure the local oscillator so that the 10 ms synchronous pulse can follow the 1 pps GPS pulse;
The input to this step is the error value calculated in step 2; At this step, each time the error value is calculated and entered into the memory, the local oscillator controller relies on this error to adjust the frequency of the local oscillator pulse so that the error values of the successive times according to convergence to 0; To achieve this, the local oscillator will apply the control algorithm (which may be chosen from an on-off control algorithm or a PID proportional integral control algorithm) to calculate and adjust the frequency of the local oscillator, finally, the 10 ms pulse was synchronized to the GPS's 1 pps pulse; After adjusting the local oscillator frequency, the oscillator continues to wait for the next error value.

* * * * *